(12) United States Patent
McCormick et al.

(10) Patent No.: US 7,646,592 B2
(45) Date of Patent: Jan. 12, 2010

(54) EXPANSION CARD RETENTION DEVICE AND METHODS THEREOF

(75) Inventors: Raymond A. McCormick, Round Rock, TX (US); Andrew Frisch, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 12/082,088

(22) Filed: Apr. 8, 2008

(65) Prior Publication Data

US 2009/0251856 A1 Oct. 8, 2009

(51) Int. Cl.
*H05K 7/12* (2006.01)

(52) U.S. Cl. .................. 361/679.02; 361/816; 361/818; 174/35 R; 174/35 GC

(58) Field of Classification Search ............ 361/679.02, 361/816, 818; 174/35 R, 35 GC
See application file for complete search history.

(56) References Cited

U.S. PATENT DOCUMENTS 7,326,077 B2 * 2/2008 Shih et al. .................... 439/372

* cited by examiner

*Primary Examiner*—Jayprakash N Gandhi
*Assistant Examiner*—Ingrid Wright
(74) *Attorney, Agent, or Firm*—O'Keefe, Egan, Peterman & Enders, LLP

(57) ABSTRACT

A retention device for computer expansion cards, a system including the device, a method of manufacture of the device, and a method of using the device, where the retention device includes a retention clip configured to engage the bracket of the expansion card to reduce flex and rotation of an expansion card when the expansion card and the retention device are installed in an expansion card bay of a computer system, and wherein the retention clip is configured to contact the proximal end of the expansion card.

20 Claims, 3 Drawing Sheets

EXPANSION CARD RETENTION DEVICE AND METHODS THEREOF

FIELD OF THE INVENTION

This invention relates generally to retention clips for expansion cards, such as PCI cards, for computers, and methods thereof.

BACKGROUND OF THE INVENTION

Computers, including servers, often include expansion capabilities to allow insertion of various expansion cards, such as PCI cards, into the system. In some systems, the card is installed by securing a fastener the PCI card bracket to the case. However, prior systems were prone to flex and rotation of the cards that undesirably effected electromagnetic interference (EMI) patterns of individual systems.

SUMMARY OF THE INVENTION

The present inventors have identified a problem with this configuration. In particular, it has been found that when cables or the like are connected to the external data input/output ports of the card, the card may be prone to flex. Such flexing is undesirable because it often rotates and flexes in unpredictable ways depending on how many and what type of cable is attached, varying pressure of the cables to the cards, all of which leads to great difficulties in identifying an electromagnetic interference (EMI) profile. Likewise, flex and rotation may lead undesirably to separation of the card from internal EMI suppression gasket material. Importantly, this invention provides a relatively simple solution to a relatively complex problem identified by the inventors that is discussed above. This invention has especial applicability to server computers.

In one broad respect, this invention is a retention device for computer expansion cards, comprising: an elongate body configured for use as a retention device for computer expansion cards in a computer case assembly; wherein the elongate body includes a flat top component adapted to stop movement of the retention device as the retention device is placed into a slot of the computer case assembly; wherein the elongate body includes electromagnetic interference shielding components on two opposite sides of the elongate body; wherein the elongate body includes a retention clip extending perpendicular to the sides of the elongate body having electromagnetic interference shielding components, wherein the retention clip is configured to engage the bracket of the expansion card to reduce flex and rotation of an expansion card when the expansion card and the retention device are installed in an expansion card bay of a computer system, and wherein the retention clip is configured to contact the proximal end of the expansion card.

In certain embodiments, the elongate body can be formed from a polymer; the elongate body generally can have a generally cuboid shape; the flat top component and retention clip, flat top component, and elongate body can be formed into a single piece; the device can be configured for use with a PCI card; and combinations thereof.

In another embodiment, this invention is a system, comprising: a computer having at least one expansion slot, wherein at least one expansion slot is fitted with an expansion card, and a retention device to limit movement of the expansion card, wherein the retention device for computer expansion cards comprises: an elongate body configured for use as a retention device for computer expansion cards in a computer case assembly; wherein the elongate body includes a flat top component adapted to limit movement of the retention device as the retention device is placed into a slot of the computer case assembly; wherein the elongate body includes electromagnetic interference shielding components on two opposite sides of the elongate body; wherein the elongate body includes a retention clip extending perpendicular to the sides of the elongate body having electromagnetic interference shielding components, wherein the retention clip is configured to engage a bracket of an expansion card to reduce flex and rotation of an expansion card when the expansion card and the retention device are installed in an expansion card bay of a computer system, and wherein the retention clip is configured to contact the proximal end of the expansion card.

In another embodiment, this invention is process for the manufacture of a retention device for computer expansion cards, comprising: providing an elongate body configured for use as a retention device for computer expansion cards in a computer case assembly; wherein the elongate body includes a flat top component adapted to stop movement of the retention device as the retention device is placed into a slot of the computer case assembly; providing electromagnetic interference shielding components on two opposite sides of the elongate body; providing a retention clip for the elongate body that extends perpendicular to the sides of the elongate body having electromagnetic interference shielding components, wherein the retention clip is configured to engage the bracket of the expansion card to reduce flex and rotation of an expansion card when the expansion card and the retention device are installed in an expansion card bay of a computer system, and wherein the retention clip is configured to contact the proximal end of the expansion card.

In another embodiment, this invention is a process for limiting movement of an expansion card in a computer system, comprising: employing a retention device that inserts into a slot in the computer to limit movement of the expansion card, wherein the retention device for computer expansion cards comprises: an elongate body configured for use as a retention device for computer expansion cards in a computer case assembly; wherein the elongate body includes a flat top component adapted to stop movement of the retention clip as the retention clip is placed into a slot of the computer case assembly; wherein the elongate body includes electromagnetic interference shielding components on two opposite sides of the elongate body; wherein the elongate body includes a retention clip extending perpendicular to the sides of the elongate body having electromagnetic interference shielding components, wherein the retention clip is configured to reduce flex and rotation of an expansion card when the expansion card and the retention device are installed in an expansion card bay of a computer system, and wherein the retention clip is configured to contact the proximal end of the expansion card.

DESCRIPTION OF ILLUSTRATIVE EMBODIMENTS

Figure 1:
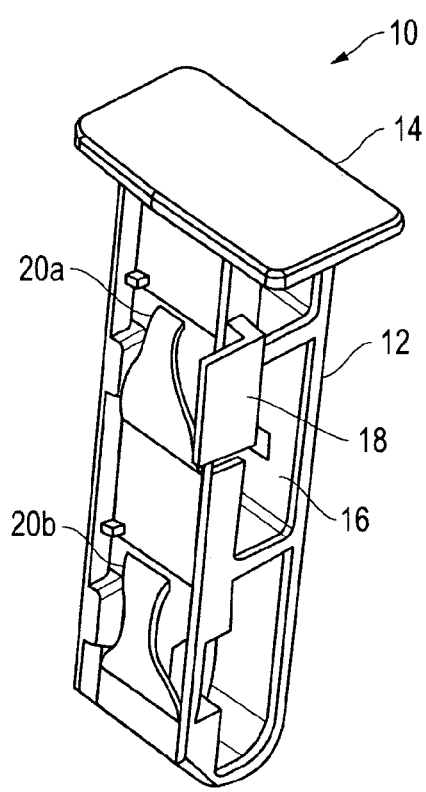
FIGS. 1-3 shows views of a representative retention device of this invention.
Figure 2:
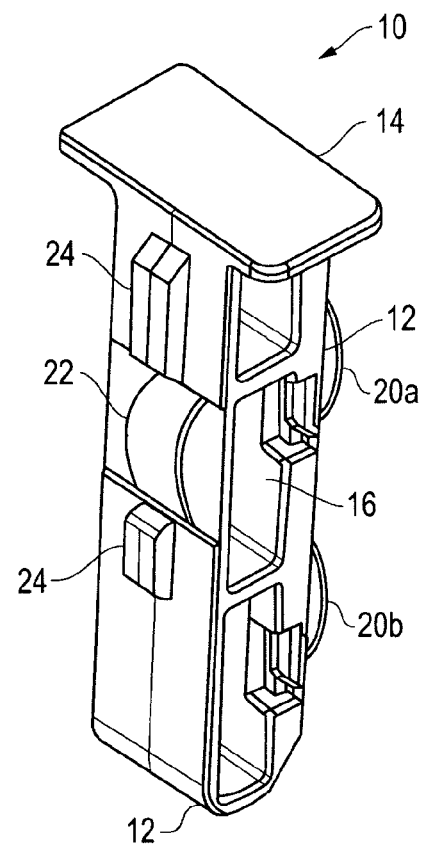
Figure 3:
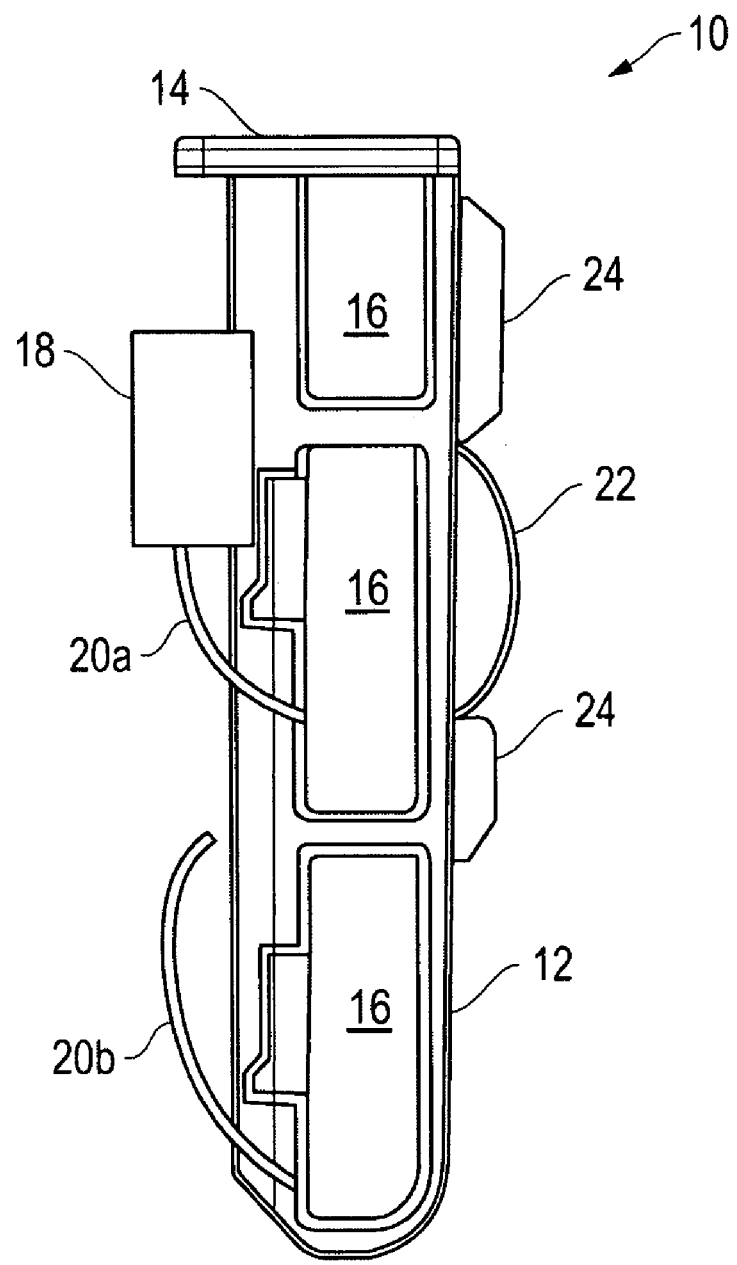

FIGS. 1-3 show a representative retention device 10 of this invention. In these Figures, the device 10 includes an elongate body 12 that is configured (sized and shaped, or otherwise adapted) for use as a retention device for computer expansion cards in a computer case assembly. FIGS. 1 and 2 show perspective views of the device 10, each from the opposite side view of the other. The device 10 includes a flat top component 14 on a first end of the elongate body 12. The flat top can serve to serve as a stop when the device 10 is positioned in the computer case and also serves to provide a surface for manual insertion of the device 10 by an operator. Thus, the flat top component is adapted and configured to stop movement of the retention device as the retention device is placed or inserted into a slot of the computer case assembly. The elongate body 12 can be made of various materials. Typically the elongate body 12 and flat top 14 are made of a synthetic polymer. In FIGS. 1-3, the elongate body 12 is generally of a cuboid shape, though this shape will depend on the given slot available in the computer assembly chassis. While the flat top 14 can be a separate component that can be attached to the elongate body 12, typically the elongate body 12 and flat top 14 are a single piece produced by molding or the like. In the device 10 depicted in the Figures, the elongate body 12 includes void spaces 16. This can serve to reduce cost of manufacturing the device 10. The elongate body 12 may alternatively be a solid piece with no void space.

The retention device 10 includes a retention clip 18. The retention clip 18 may also be referred to as a retention tab. Prior retention devices lacked such a retention clip 18. The retention clip 18 is configured to engage the bracket of the expansion card to reduce flex and rotation of an expansion card when the expansion card and the retention device are installed in an expansion card bay of a computer system. This configuration may vary depending on the size and type of expansion card being retained. In one embodiment, the elongate body 12, flat top 14, and retention clip 18 are a singled piece, such as formed from a mold using a suitable polymer. As shown in FIGS. 1-3, the retention clip 18 retention clip extends perpendicular to the sides of the elongate body having the EMI shielding components 20a, 20b, and 22. During use, the retention clip 18 is in contact with the expansion card bracket at least a portion of the time, and in one embodiment is in contact all of the time. In particular, the retention clip is configured to contact the proximal end of the expansion card. The contact of the retention clip 18 with the expansion card bracket serves to reduce flex and rotation of the expansion card during use, where the flex and/or rotation may be due to the connection of the cables or the like to the external data input/output ports of the expansion card. The reduction in flex and rotation of the expansion card is highly desirable as it reduces the ways that the card may flex and the extent to which the card may flex during use. Accordingly, the retention device 10 of this invention, by including the retention clip 18, improves the ability to identify EMI profile. Likewise, by reducing flex and rotation, the retention clip 18 reduces the possibility of the expansion card becoming separated from internal EMI suppression gasket material.

In addition, the retention device 10 includes electromagnetic interference shielding components 20a, 20b, and 22 on two opposite sides of the elongate body 12. The EMI shielding components 20a, 20b, and 22 are well known components in the art. Typically the EMI shielding components are made of thin strips of metal, such as being made of copper, tin, iron, steel, and the like. Each component may be made of a different material, as per design choice depending on the circumstances. In FIGS. 1-3, EMI shielding components 20a, 20b, and 22 are made of thin metal sheets cut to specification that can flex to improve contact with the internal EMI suppression gasket material that is typically in the computer case assembly. As shown in FIG. 3, component 22 is positioned so that both ends of the metal strip are inserted into appropriate notches in the elongate body 12 so that component 22 bows outward. Components 20a and 20b, by contrast, are inserted at one end into the elongate body 12 with the other end being free standing. Components 20a and 20b are also bowed, but components 20a and 20b can flex at their pivot point as pressure is applied against them as the device 10 is inserted into a receiving slot in a computer assembly chassis.

The retention device 10 may include additional protuberances, notches, or slots so as to fit into the slot of a given computer assembly chassis, to serve as a retention device, and to contact the expansion card bracket. For example, in FIG. 1, the retention device 10 includes protuberances 24 that serve to align the device while being introduced into the computer assembly chassis bay.

Figure 4:
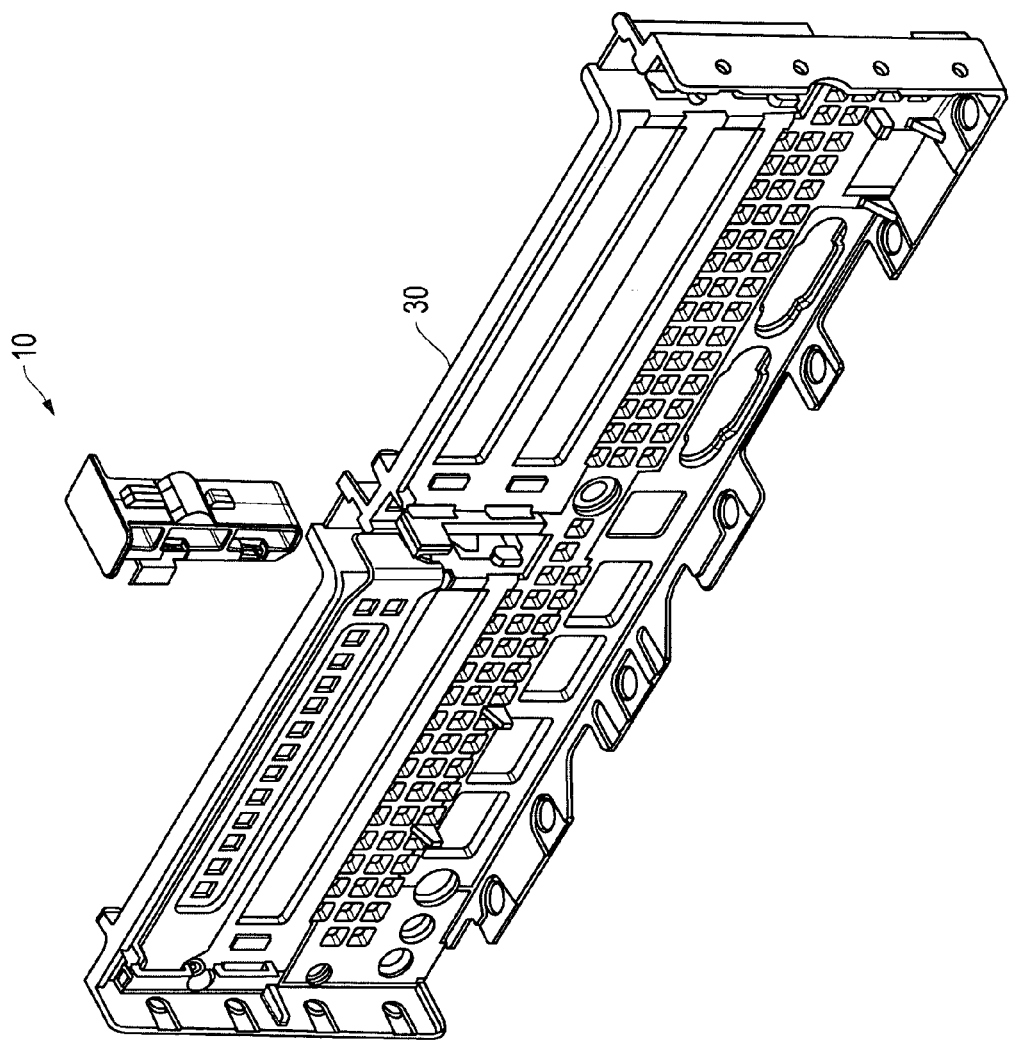
FIG. 4 shows a representative retention device in a position to be inserted into a receiving slot of a computer assembly chassis.

FIG. 4 depicts a retention device 10 in position to be inserted into a receiving slot of the expansion card bay on a side of the computer assembly chassis 30. When inserted, the EMI shielding components 20a, 20b, and 22 align and contact EMI suppression gasket material (not shown) that is internal to the computer assembly chassis 30. In this embodiment, the flat top 14 contacts the upper rim 32 of the receiving slot to thereby stop the device 10 from being inserted further. As shown, the retention clip 14 extends perpendicular to the sides of the elongate body 12 that include the EMI shielding components 20a, 20b, and 22. During use an expansion card will have been fitted into the computer assembly chassis 30 prior to the retention device 10 being inserted. The retention clip 18 contacts the proximal end of the expansion card bracket to reduce flexing of the expansion card during use.

This invention includes the process of making and using the retention device, as well as a computer assembly that employs the retention device. The process of making the retention device is relatively simple and can be readily made commercially. Typically a mold will be made based on suitable engineering drawings to form a single piece body that includes the elongate body, retention clip, and flat top. The device will be desired as appropriate to include the EMI shielding components as is known by those of skill in the art. The size and shape of the device will be dictated by the receiving slot of the computer assembly chassis.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A retention device for computer expansion cards, comprising: an elongate body configured for use as a retention device for computer expansion cards in a computer case assembly; wherein the elongate body includes a flat top component that extends beyond at least one side of the elongate body and is perpendicular to the elongate body, wherein the flat top component is adapted to contact the computer case assembly to stop movement of the retention device as the retention device is placed into a slot of the computer case assembly; wherein the elongate body includes electromagnetic interference shielding components on two opposite sides of the elongate body, wherein retention device is configured so that the electromagnetic interference shielding components can contact internal electromagnetic interference gasket material in a computer case assembly; wherein the elongate body includes a retention clip extending perpendicular to the sides of the elongate body having electromagnetic interference shielding components, wherein the retention clip is configured to engage a bracket of the expansion card to reduce flex and rotation of an expansion card when the expansion card and the retention device are installed in an expansion card bay of a computer system, and wherein the retention clip is configured to contact a proximal end of the expansion card.

2. The device of claim 1, wherein the elongate body is formed from a polymer.

3. The device of claim 1, wherein the elongate body generally has cuboid shape.

4. The device of claim 1, wherein the flat top component and retention clip, flat top component, and elongate body were formed into a single piece.

5. A process for the manufacture of a retention device for computer expansion cards, comprising: providing an elongate body configured for use as a retention device for computer expansion cards in a computer case assembly; wherein the elongate body includes a flat top component that extends beyond at least one side of the elongate body and is perpendicular to the elongate body, wherein the flat top component is adapted to contact the computer case assembly to stop movement of the retention clip as the retention clip is placed into a slot of the computer case assembly; providing electromagnetic interference shielding components on two opposite sides of the elongate body, wherein retention device is configured so that the electromagnetic interference shielding components can contact internal electromagnetic interference gasket material in a computer case assembly; providing a retention clip for the elongate body that extends perpendicular to the opposite sides of the elongate body having electromagnetic interference shielding components, wherein the retention clip is configured to engage a bracket of the expansion card to reduce flex and rotation of an expansion card when the expansion card and the retention device are installed in an expansion card bay of a computer system, and wherein the retention clip is configured to contact a proximal end of the expansion card.

6. A system, comprising: a computer having at least one expansion slot, wherein at least one expansion slot is fitted with an expansion card, and a retention device to limit movement of the expansion card, wherein the retention device for computer expansion cards comprises: an elongate body configured for use as a retention device for computer expansion cards in a computer case assembly; wherein the elongate body includes a flat top component that extends beyond at least one side of the elongate body and is perpendicular to the elongate body, wherein the flat top component is adapted to contact the computer case assembly to limit movement of the retention device as the retention device is placed into a slot of the computer case assembly; wherein the elongate body includes electromagnetic interference shielding components on two opposite sides of the elongate body, wherein retention device is configured so that the electromagnetic interference shielding components can contact internal electromagnetic interference gasket material in a computer case assembly; wherein the elongate body includes a retention clip extending perpendicular to the opposite sides of the elongate body having electromagnetic interference shielding components, wherein the retention clip is configured to engage a bracket of an expansion card to reduce flex and rotation of an expansion card when the expansion card and the retention device are installed in an expansion card bay of a computer system, and wherein the retention clip is configured to contact a proximal end of the expansion card.

7. The system of claim 6, wherein the elongate body is formed from a polymer.

8. The system of claim 6, wherein the elongate body generally has cuboid shape.

9. The system of claim 6, wherein the flat top component and retention clip, flat top component, and elongate body were formed into a single piece.

10. The system of claim 6, wherein the retention device is configured for use with a PCI card.

11. A process for limiting movement of an expansion card in a computer system, comprising: employing a retention device that inserts into a slot in a computer to limit movement of the expansion card, wherein the retention device for computer expansion cards comprises: an elongate body configured for use as a retention device for computer expansion cards in a computer case assembly; wherein the elongate body includes a flat top component that extends beyond at least one side of the elongate body and is perpendicular to the elongate body, wherein the flat top component is adapted contact the computer case assembly to stop movement of a retention clip as the retention clip is placed into a slot of the computer case assembly; wherein the elongate body includes electromagnetic interference shielding components on two opposite sides of the elongate body, wherein retention device is configured so that the electromagnetic interference shielding components can contact internal electromagnetic interference gasket material in a computer case assembly; wherein the elongate body includes a retention clip extending perpendicular to the sides of the elongate body having electromagnetic interference shielding components, wherein the retention clip is configured to reduce flex and rotation of an expansion card when the expansion card and the retention device are installed in an expansion card bay of a computer system, and wherein the retention clip is configured to contact the proximal end of the expansion card.

12. The process of claim 11, wherein the elongate body is formed from a polymer.

13. The process of claim 11, wherein the elongate body generally has cuboid shape.

14. The process of claim 11, wherein the flat top component and retention clip, flat top component, and elongate body were formed into a single piece.

15. The process of claim 11, wherein the retention device is configured for use with a PCI card.

16. The process of claim 5, wherein the retention device is configured for use with a PCI card.

17. The process of claim 16, wherein the elongate body is formed from a polymer.

18. The process of claim 16, wherein the elongate body generally has cuboid shape.

19. The process of claim 16, wherein the flat top component and retention clip, flat top component, and elongate body were formed into a single piece.

20. The process of claim 5, wherein the retention device is configured for use with a PCI card.

* * * * *

UNITED STATES PATENT AND TRADEMARK OFFICE
CERTIFICATE OF CORRECTION

PATENT NO. : 7,646,592 B2 Page 1 of 1
APPLICATION NO. : 12/082088
DATED : January 12, 2010
INVENTOR(S) : Raymond A. McCormick and Andrew Frisch It is certified that error appears in the above-identified patent and that said Letters Patent is hereby corrected as shown below:

In claim 11, column 6, line 24, delete "fiat," and insert --flat--.

Signed and Sealed this

Ninth Day of March, 2010

David J. Kappos
*Director of the United States Patent and Trademark Office*